United States Patent
Sakai et al.

(10) Patent No.: US 12,478,645 B2
(45) Date of Patent: Nov. 25, 2025

(54) METHOD FOR MANUFACTURING CELL POPULATION INCLUDING LIVER PRECURSOR CELLS

(71) Applicant: NAGASAKI UNIVERSITY, Nagasaki (JP)

(72) Inventors: Yusuke Sakai, Nagasaki (JP); Susumu Eguchi, Nagasaki (JP)

(73) Assignee: NAGASAKI UNIVERSITY, Nagasaki (JP)

( * ) Notice: Subject to any disclaimer, the term of this patent is extended or adjusted under 35 U.S.C. 154(b) by 848 days.

(21) Appl. No.: 17/599,619

(22) PCT Filed: Mar. 27, 2020

(86) PCT No.: PCT/JP2020/013987
§ 371 (c)(1),
(2) Date: Sep. 29, 2021

(87) PCT Pub. No.: WO2020/203753
PCT Pub. Date: Oct. 8, 2020

(65) Prior Publication Data
US 2022/0160785 A1 May 26, 2022

(30) Foreign Application Priority Data
Mar. 29, 2019 (JP) .................................. 2019-068911

(51) Int. Cl.
*A61K 35/407* (2015.01)
*A61L 27/38* (2006.01)
*C12N 5/071* (2010.01)

(52) U.S. Cl.
CPC ............ *A61K 35/407* (2013.01); *A61L 27/38* (2013.01); *C12N 5/067* (2013.01); *C12N 2506/1307* (2013.01); *C12N 2533/54* (2013.01)

(58) Field of Classification Search
None
See application file for complete search history.

(56) References Cited

U.S. PATENT DOCUMENTS

| | | | |
|---|---|---|---|
| 2008/0311094 A1* | 12/2008 | Sokal | A61P 3/00 435/69.3 |
| 2010/0093053 A1 | 4/2010 | Oh et al. | |
| 2013/0071931 A1 | 3/2013 | Ishikawa | |
| 2019/0010464 A1* | 1/2019 | Ochiya | C12N 5/0672 |
| 2019/0302100 A1* | 10/2019 | Katsuda | C12N 5/0672 |
| 2020/0093053 A1* | 3/2020 | Ehlert | G06Q 50/02 |

FOREIGN PATENT DOCUMENTS

| | | |
|---|---|---|
| JP | 2009-520474 A | 5/2009 |
| JP | 2011-514169 A | 5/2011 |
| WO | WO-2013/018851 A1 | 2/2013 |
| WO | WO-2017/119512 A1 | 7/2017 |
| WO | WO-2018/079714 A1 | 5/2018 |

OTHER PUBLICATIONS

International Search Report, PCT/JP2020/013987, dated Jun. 23, 2020.
Katsuda et al., Conversion of Terminally Committed Hepatocytes to Culturable Bipotent Progenitor Cells with Regenerative Capacity, *Cell Stem Cell* 20:41-55 (2017).
Miyajima et al., Stem/progenitor cells in liver development, homeostasis, regeneration, and reprogramming, *Cell Stem Cell* 14:561-74 (2014).
Written Opinion of the International Searching Authority, PCT/JP2020/013987, dated Jun. 23, 2020.

* cited by examiner

*Primary Examiner* — Russell G Fiebig
(74) *Attorney, Agent, or Firm* — MARSHALL, GERSTEIN & BORUN LLP (57) ABSTRACT

A method for producing a cell population containing liver progenitor cells, including the steps of
(1) preparing a culture substratum containing a cell population comprising liver progenitor cells and fibroblasts,
(2) physically removing the fibroblast colony from the culture substratum,
(3) detaching cells from the culture substratum, and recovering the detached cells, and
(4) culturing the cells recovered in the step (3) on a collagen-coated culture substratum, and recovering the cells not adhered to the culture substratum is provided by the present invention.

7 Claims, 2 Drawing Sheets

METHOD FOR MANUFACTURING CELL POPULATION INCLUDING LIVER PRECURSOR CELLS

CROSS REFERENCE TO RELATED APPLICATIONS

This application is a U.S. National Stage of International Application No. PCT/JP2020/013987, filed Mar. 27, 2020, which claims the benefit of Japanese Patent Application No. 2019-068911, filed Mar. 29, 2019, the entire contents of each of which are fully incorporated herein by reference.

TECHNICAL FIELD

The present invention relates to a production method of a cell population containing liver progenitor cells, including a step of removing fibroblasts from a cell population containing liver progenitor cells and fibroblasts, and the like.

BACKGROUND ART

In the field of liver regenerative medicine, liver progenitor cells are attracting attention as a cell source. However, only a few liver progenitor cells are present in the liver and they are difficult to collect. In recent years, reprogramming methods using low-molecular-weight compounds have made it possible to produce liver progenitor cells from hepatocytes in vitro. Specifically, liver stem/progenitor cells can be produced by contacting mammalian hepatocytes with a TGFβ receptor inhibitor, further, a GSK3 inhibitor and/or a ROCK inhibitor (patent document 1 and non-patent document 1). In addition, human liver progenitor cells can be prepared by culturing human mature hepatocytes in a medium containing serum, A-83-01 (TGFβ signal inhibitor) and CHIR99021 (GSK3 inhibitor) (patent document 2).

However, since the liver contains hepatocytes and fibroblasts, a cell population containing liver progenitor cells isolated from the liver and a cell population containing hepatocyte progenitor cells obtained from hepatocytes by a reprogramming method using a low-molecular-weight compound by the above-mentioned method contain fibroblasts. Since fibroblasts proliferate faster than liver progenitor cells, fibroblasts in the culture prevent proliferation of liver progenitor cells. Therefore, when using a cell population containing liver progenitor cells, it is necessary to remove fibroblasts in advance to increase the purity of liver progenitor cells.

As a method for removing such fibroblasts, the FACS (Fluorescence activated cell sorting) method and the MACS (Magnetic cell sorting) method are generally used. However, since a cell surface marker capable of accurately isolating liver progenitor cells has not been found, it is difficult to sort liver progenitor cells and remove fibroblasts sufficiently in a large amount. In addition, when FACS or MACS is used, damage to cells cannot be ignored, and the activity and the like of isolated liver progenitor cells are also adversely affected.

DOCUMENT LIST

Patent Documents patent document 1: WO 2017/119512 A1
patent document 2: WO 2018/079714 A1

Non-Patent Documents non-patent document 1: Cell Stem Cell 20, 41-55, Jan. 5, 2017

SUMMARY OF INVENTION

Technical Problem

An object of the present invention is to provide a method for producing a cell population by sufficiently removing fibroblasts from a cell population containing liver progenitor cells and fibroblasts, without using FACS or MACS. Another object with this method is to maintain a high level of purity of liver progenitor cells stably for a long period of time even after repeated passages. Furthermore, it is also an object to provide a cell population with high purity of liver progenitor cells by using such method.

Solution to Problem

The present inventors have conducted intensive studies and took note of the difference in the adhesiveness of liver progenitor cells and fibroblasts to a culture substratum, and obtained an idea that it may be possible to separate hepatic progenitor cells from fibroblasts based on the adhesiveness by using one or more different types of culture substratum. They have conducted researches based on the idea and found that fibroblasts can be sufficiently removed from a cell population containing hepatic progenitor cells and fibroblasts, which resulted in the completion of the present invention.

That is, the present invention provides the following.

[1] A method for producing a cell population comprising liver progenitor cells, comprising the steps of
(1) preparing a culture substratum comprising a cell population comprising liver progenitor cells and fibroblasts,
(2) physically removing the fibroblast colony from the aforementioned culture substratum,
(3) detaching cells from the aforementioned culture substratum, and recovering the detached cells, and
(4) culturing the cells recovered in the aforementioned step (3) on a collagen-coated culture substratum, and recovering the cells not adhered to the aforementioned culture substratum.

[2] The method of [1], further comprising a step of (5) culturing the aforementioned recovered cells on a collagen-coated culture substratum, and removing the cells not adhered to the aforementioned culture substratum after step (4).

[3] The method of [2], further comprising a step of (3') culturing the aforementioned recovered cells on a gelatin-coated culture substratum, and recovering the cells not adhered to the aforementioned culture substratum between step (3) and step (4).

[4] The method of [2] or [3], further comprising a step of (6) detaching and recovering the cells adhered to the aforementioned culture substratum from the aforementioned culture substratum before reaching confluence after step (5).

[5] The method of [2] or [3], further comprising a step of (7) detaching and recovering the cells adhered to the aforementioned culture substratum from the aforementioned culture substratum after reaching confluence after step (5).

[6] The method of any of [1] to [5], wherein the culture period in step (4) is 5 min-15 min.

[7] The method of any of [1] to [6], wherein the cell population prepared in step (1) comprises a liver progenitor cell obtained by reprogramming hepatocyte.

[8] The method of any of [3] to [7], wherein step (3')-step (5) are repeated at least twice.

[9] A method for removing fibroblast from a cell population comprising liver progenitor cell and fibroblast, comprising the steps of
(1) preparing a culture substratum comprising a cell population comprising liver progenitor cells and fibroblasts,
(2) physically removing the fibroblast colony from the aforementioned culture substratum,
(3) detaching cells from the aforementioned culture substratum, and recovering the detached cells, and
(4) culturing the cells recovered in the aforementioned step
(3) on a collagen-coated culture substratum, and recovering the cells not adhered to the aforementioned culture substratum.

[10] A cell population comprising the liver progenitor cell obtained by the method of any of [1] to [8].

[11] A cell transplantation therapy agent comprising the cell population of [10].

[12] A cell population comprising hepatocyte and obtained by inducing differentiation of the cell population of [10].

[13] A cell population comprising bile duct epithelial cell and obtained by inducing differentiation of the cell population of [10].

[14] A method for evaluating metabolism of a test compound in the body of a mammal, comprising the steps of
(1) contacting the cell of any of [10], [12] and [13] with a test compound, and
(2) measuring the metabolism of the test compound in the aforementioned cell.

[15] A method for evaluating hepatotoxicity of a test compound in a mammal, comprising the steps of
(1) contacting the cell of any of [10], [12] and [13] with a test compound, and
(2) detecting or measuring the presence or absence or degree of damage of the aforementioned cell.

[16] A method for the treatment, improvement or prophylaxis of hepatopathy, liver fibrosis or fatty liver, comprising a step of administering or transplanting an effective amount of the cell population of [10] or the cell transplantation therapy agent of [11] to a subject.

Advantageous Effects of Invention

According to the present invention, a method for producing a cell population by sufficiently removing fibroblasts from a cell population containing hepatocyte-derived liver progenitor cells and fibroblasts, without using FACS or MACS is provided. According to the method, moreover, a high level of purity of liver progenitor cells can be maintained stably for a long period of time even after repeated passages. Furthermore, using the method, a cell population with high purity of liver progenitor cells is provided. Since FACS or MACS is not used in the liver progenitor cells obtained in the present invention, the cells can have higher activity than the liver progenitor cells obtained by a conventional method using FACS and MACS.

DESCRIPTION OF EMBODIMENTS

1. Method for Producing Cell Population Containing Liver Progenitor Cell

The present invention provides a method for producing a cell population containing liver progenitor cells (hereinafter sometimes to be referred to as "the production method of the present invention"). The production method of the present invention includes the following steps of
(1) preparing a culture substratum comprising a cell population comprising liver progenitor cells and fibroblasts,
(2) physically removing the fibroblast colony from the aforementioned culture substratum,
(3) detaching cells from the aforementioned culture substratum, and recovering the detached cells, and
(4) culturing the cells recovered in the aforementioned step (3) on a collagen-coated culture substratum, and recovering the cells not adhered to the aforementioned culture substratum.

As described above, a cell population containing liver progenitor cells after removal of fibroblasts is obtained by the production method of the present invention. Therefore, the present invention also provides a method for removing fibroblasts from a cell population comprising liver progenitor cells and fibroblasts, the method including the above-mentioned steps (1)-(4) (hereinafter sometimes to be referred to as "the removal method of the present invention"). In the following, the production method of the present invention and the removal method of the present invention are sometimes to be collectively referred simply to as "the method of the present invention".

1-1. Step (1)

The liver progenitor cell contained in the cell population prepared in the aforementioned step (1) is not particularly limited, and may be, for example, a liver progenitor cell isolated from the liver by using FACS, MACS, or the like, or a liver progenitor cell established by reprogramming hepatocyte with a low-molecular-weight compound. From the aspect that a sufficient amount of cells can be obtained, a liver progenitor cell established by reprogramming hepatocyte (hereinafter sometimes to be referred to as "CLiP (Chemically-induced Liver Progenitor)") is preferred. The method for isolating liver progenitor cells from the liver may be a method known per se. For example, a method for isolating using FACS or MACS and using the markers of liver progenitor cells described below as an index can be mentioned. In addition, the hepatocyte reprogramming method can also be performed by a method known per se described below. As described above, liver progenitor cells and fibroblasts are generally mixed in the thus-obtained cell population containing the liver progenitor cells. The culture substratum containing the above-mentioned cell population is not particularly limited and, for example, dish, petri dish, dish for tissue culture, multi dish, microplate, microwell plate, Multiplate, multiwell plate, chamber slide, Schale and the like can be mentioned.

In the present specification, the "liver progenitor cell" means a cell having (a) self-renewal ability and (b) bipotentiality permitting differentiation into both hepatocytes and bile duct epithelial cells. As used herein, the "bile duct epithelial cell" (to be also referred to as "BEC") refers to a cell expressing the BEC markers cytokeratin 19 (CK19) and GRHL2. The liver progenitor cell also includes hepatoblast of the fetal liver and oval cells that appear during hepatopathy. In one preferred embodiment, the liver progenitor cell used in the method of the present invention (c) expresses epithelial cell adhesion molecules (EpCAM) as surface antigen marker in addition to the above-mentioned properties (a) and (b) above. In one embodiment, the liver progenitor cell used in the method of the present invention does not express known LSC markers delta homologue 1 (Dlk1), leucine-rich repeat-containing G protein-coupled receptor 5 (LGR5) or FoxL1.

CLiP can be produced, for example, by a method including contacting mammalian hepatocytes with a TGFβ receptor inhibitor in vitro (WO 2017/119512 A1, Cell Stem Cell 20, 41-55, Jan. 5, 2017) (hereinafter sometimes to be referred to as "production method of liver stem/progenitor cells"). CLiP can also be produced by a method including culturing human mature hepatocytes in a medium containing serum, A-83-01 and CHIR99021 (WO 2018/079714 A1) (hereinafter sometimes to be referred to as "preparation method of human liver progenitor cell).

In the following, a step of preparing a cell population containing hepatocyte-derived liver progenitor cells and fibroblasts (hereinafter sometimes to be referred to as "the cell population in the present invention") based on the production method of CLiP is described.

The "hepatocyte" used as a starting material for the cell population in the present invention refers to a cell expressing at least one kind of hepatocyte marker gene (e.g., albumin (ALB), transthyretin (TTR), glucose-6-phosphatase (G6PC), tyrosine aminotransferase (TAT), tryptophan-2,3-dioxygenase (TDO2), cytochrome P450 (CYP), miR-122, etc.) (preferably two or more kinds, more preferably 3 or more kinds, further preferably 4 or more kinds, particularly preferably 5 or more kinds, most preferably all 6 kinds selected from ALB, TTR, G6PC, TAT, TDO2 and CYP). It is desirable that the hepatocyte be functional. The "functional" hepatocyte refers to a hepatocyte maintaining one or more, preferably two or more, more preferably three or more, further preferably four or more, most preferably all, functions selected from (i) having a bile canaliculus structure and accumulating drug metabolites in the canaliculus, (ii) expressing ABC transporters (e.g., MDR1, MRP, etc.) on the cell membrane, (iii) ALB secretion for secretion, (iv) glycogen accumulation, and (v) drug-metabolizing enzyme (e.g., CYP1A1, CYP1A2, etc.) activity.

The hepatocytes used to prepare the cell population in the present invention may be provided from any source as long as they are characterized by the expression of the above-mentioned hepatocyte marker genes. For example, they may also include hepatocytes obtained from pluripotent stem cells such as embryonic stem cells (ES cells), iPS cells and the like of mammals (e.g., human, rat, mouse, guinea pig, rabbit, sheep, horse, swine, bovine, monkey, etc., preferably human, rat, mouse) by a differentiation induction method known per se (e.g., Zhu, S. et al., Nature 508, 93-97 (2014)), hepatocytes induced from fibroblasts by direct reprogramming (Huang, P. et al., Nature 475, 386-389 (2011) and Sekiya, S., and Suzuki, A. Nature 475, 390-393 (2011)), and the like. However, considering that CLiP without genetic modification can be safely and rapidly provided, it is desirable to use hepatocytes isolated and purified from the liver extracted from mammals as the hepatocytes. For example, in the case of rats, it is preferable to use a liver extracted from a 10- to 20-week-old adult rat, but a liver derived from a young rat less than 2 months old may also be used. In the case of humans, it is preferable to use an adult liver tissue section excised by surgery, but a liver excised from a dead foetus may also be used. Alternatively, a non-cancerous tissue of a liver tissue resected due to liver cancer or the like may be used. Alternatively, frozen cells (frozen hepatocytes) of hepatocytes isolated and purified from such excised liver or non-cancerous tissue of liver tissue can also be used.

Examples of a method for purifying hepatocytes from a mammalian liver or a tissue segment thereof include a perfusion method ("cultured cell experiment handbook" (YODOSHA CO., LTD., 2004) etc.). That is, after pre-perfusion with EGTA fluid through the portal vein, the liver is digested by perfusion with an enzyme solution of collagenase, dispase, and the like (Hanks solution, etc.), cell debris and non-parenchymal cells are removed by filtration, low-speed centrifugation, etc., whereby hepatocytes are purified.

The hepatocytes prepared as described above are contacted in vitro with one or more low-molecular weight molecule signal transduction pathway inhibitors, including TGFβ receptor inhibitors.

The TGFβ receptor inhibitor used for the preparation of the cell population in the present invention is not particularly limited as long as it has an action of inhibiting the function of transforming growth factor (TGF) β receptor. For example, 2-(5-benzo[1,3]dioxol-4-yl-2-tert-butyl-1H-imidazol-4-yl)-6-methylpyridine, 3-(6-methylpyridin-2-yl)-4-(4-quinolyl)-1-phenylthiocarbamoyl-1H-pyrazole (A-83-01), 2-(5-chloro-2-fluorophenyl)pteridin-4-yl)pyridin-4-yl amine (SD-208), 3-(pyridin-2-yl)-4-(4-quinonyl)]-1H-pyrazole, 2-(3-(6-methylpyridin-2-yl)-1H-pyrazol-4-yl)-1,5-naphthyridine (all above by Merck), SB431542 (Sigma Aldrich) and the like can be mentioned. Preferably, A-83-01 can be mentioned. TGFβ receptor inhibitors also include TGFβ receptor antagonists.

These TGFβ receptor inhibitors may be one kind of compound or a combination of two or more kinds of compounds.

As a low-molecular-weight molecule signal transduction pathway inhibitor other than TGFβ receptor inhibitor, preferably, GSK3 inhibitor and ROCK inhibitor can be mentioned.

The GSK3 inhibitor used for the preparation of the cell population in the present invention is not particularly limited as long as it has an action of inhibiting the function of glycogen synthase kinase (GSK) 3. For example, SB216763 (Selleck), CHIR98014 (Axon medchem), CHIR99021

(Axon medchem, AdooQ BioScience), SB415286 (Tocris Bioscience), Kenpaullone (Cosmo Bio) and the like can be mentioned. Preferably, CHIR99021 can be mentioned.

These GSK3 inhibitors may be one kind of compound or a combination of two or more kinds of compounds.

The ROCK inhibitor used for the preparation of the cell population in the present invention is not particularly limited as long as it has an action of inhibiting the function of Rho-associated kinase. As the ROCK inhibitor, for example, GSK269962A (Axon medchem), Fasudil hydrochloride (Tocris Bioscience), Y-27632 (Wako Pure Chemical Industries, Ltd., AdooQ BioScience), H-1152 (Wako Pure Chemical Industries, Ltd.) and the like can be mentioned. Preferably, Y-27632 can be mentioned.

These ROCK inhibitors may be one kind of compound or a combination of two or more kinds of compounds.

GSK3 inhibitor and ROCK inhibitor can hardly induce CLiP even when they are each brought into contact with hepatocytes alone. When a GSK3 inhibitor is contacted with hepatocytes together with a TGFβ receptor inhibitor, the CLiP induction efficiency (to be also referred to as "reprogramming efficiency") is remarkably increased as compared with contact of the TGFβ receptor inhibitor alone. When a ROCK inhibitor is contacted with hepatocytes together with a TGFβ receptor inhibitor, the reprogramming efficiency increases as compared with contact of the TGFβ receptor inhibitor alone. Therefore, in preparing the cell population in the present invention, it is preferable to bring a GSK3 inhibitor and/or a ROCK inhibitor into contact with hepatocytes in addition to the TGFβ receptor inhibitor. In particular, it is preferable to use A-83-01(A) as a TGFβ receptor inhibitor and combine CHIR99021(C) as a GSK3 inhibitor (AC), use A-83-01(A) as a TGFβ receptor inhibitor and combine Y-27632(Y) as a ROCK inhibitor (YA), and use A-83-01(A) as a TGFβ receptor inhibitor and combine CHIR99021(C) as a GSK3 inhibitor and Y-27632 (Y) as a ROCK inhibitor (YAC).

When a TGFβ receptor inhibitor is used in combination with a GSK3 inhibitor and a ROCK inhibitor, a large difference is not found in the reprogramming effect compared with when a TGFβ receptor inhibitor and a GSK3 inhibitor are used in combination. However, the former is superior to the latter in the proliferation potency of the obtained CLiP. Therefore, in a particularly preferred embodiment of the preparation of the cell population in the present invention, a TGFβ receptor inhibitor, a GSK3 inhibitor and a ROCK inhibitor are brought into contact with hepatocytes.

In the preparation of the cell population in the present invention, a low-molecular-weight molecule signal transduction pathway inhibitor other than the GSK3 inhibitor and the ROCK inhibitor can also be combined with the TGFβ receptor inhibitor. Examples of such inhibitors include, but are not limited to, MEK inhibitor and the like. The MEK inhibitor is not particularly limited as long as it has an action of inhibiting the function of MEK (MAP kinase-ERK kinase). For example, AZD6244, CI-1040 (PD184352), PD0325901, RDEA119 (BAY869766), SL327, U0126 (all above by Selleck), PD98059, U0124, U0125 (all above by Cosmo Bio) and the like can be mentioned.

In the preparation of the cell population in the present invention, contact between hepatocytes and a low-molecular-weight molecule signal transduction pathway inhibitor, including TGFβ receptor inhibitor, can be achieved by culturing hepatocytes in the presence of these inhibitors. Specifically, these inhibitors are added to the medium at an effective concentration and culture is performed. As the medium, a medium widely used for culturing animal cells can be used as the basal medium. A commercially available basal medium may be used, and examples thereof include minimal essential medium (MEM), Dulbecco modified minimal essential medium (DMEM), RPMI1640 medium, 199 medium, Ham's F12 medium, William's E medium and the like. These may be used alone or in combination of two or more (e.g., mixed medium of DMEM and Ham's F12 medium (DMEM/F12), etc.), but are not particularly limited thereto. Examples of additive to the medium include various amino acids (e.g., L-glutamine, L-proline, etc.), various inorganic salts (selenious acid salt, $NaHCO_3$, etc.), various vitamins (nicotine amide, ascorbic acid derivative, etc.), various antibiotics (e.g., penicillin, streptomycin, etc.), antifungal agents (e.g., amphotericin, etc.), buffering agents (HEPES, etc.), supplements (insulin-transferrin-serine (ITS)-X supplement, etc.), NaOH and the like.

In addition, 1-20% serum (FBS, etc.) can be added to the medium, but a serum-free medium may also be used. In the case of serum-free medium, serum replacements (BSA, HAS, KSR, etc.) may be added. Furthermore, factors such as growth factor, cytokine, hormone and the like are generally added. Examples of these factors include, but are not limited to, epithelial growth factor (EGF), insulin, transferrin, hepatocyte growth factor (HGF), oncostatin M (OsM), hydrocortisone 21-hemisuccinic acid or a salt thereof, dexamethasone (Dex) and the like.

The concentration of the TGFβ receptor inhibitor added to the medium is, for example, 0.01-10 µM, preferably 0.1-9 µM, more preferably 0.3-7 µM, further preferably 0.5-5 µM.

The concentration of the GSK3 inhibitor added to the medium is, for example, 0.01-100 µM, preferably 1-10 µM, more preferably 1-5 µM, further preferably 3 µM.

The concentration of the ROCK inhibitor added to the medium is, for example, 0.0001-500 µM, preferably 1-50 µM, more preferably 1-25 µM, further preferably 10 µM.

When these inhibitors are water-insoluble or poorly water-soluble compounds, they may be dissolved in a small amount of a low-toxic organic solvent (for example, DMSO) and then added to the medium to the above-mentioned final concentration.

The culture vessel used for the culture is not particularly limited as long as it is suitable for adhesion culture. For example, dish, petri dish, dish for tissue culture, multi dish, microplate, microwell plate, Multiplate, multiwell plate, chamber slide, Schale, tube, tray, culture bag and the like can be mentioned. As the culture vessel, one whose inner surface is coated with a cell-supporting substrate for the purpose of improving adhesion to cells can be used. Examples of such cell-supporting substrate include collagen, gelatin, Matrigel, poly-L-lysine, laminin, fibronectin and the like. Preferably, collagen and Matrigel can be mentioned.

Hepatocytes can be seeded on a culture vessel at a cell density of $10^2$-$10^6$ cells/cm$^2$, preferably $10^3$-$10^5$ cells/cm$^2$ (e.g., $1.2 \times 10^4$ cells/cm$^2$, etc.). Culturing can be performed in an atmosphere with a C02 concentration of 1-10%, preferably 2-5%, more preferably about 5% in a C02 incubator, with an oxygen concentration of 1-25%, preferably 2-22%, more preferably 3-20%, at a culture temperature of 30-40° C., preferably 35-37.5° C., more preferably about 37° C. The culture period includes, for example, 1-4 weeks, preferably 1-3 weeks, and more preferably about 2 weeks. Alternatively, the period until reaching confluence (e.g., 1-2 months, etc.) can be mentioned. The medium is replaced with a fresh medium every 1-3 days.

Hepatocytes can be reprogrammed to CLiP by contacting the hepatocytes with a TGFβ receptor inhibitor and optionally with a GSK3 inhibitor and/or a ROCK inhibitor, as described above. Mature hepatocytes are generally considered to not proliferate in vitro. For example, when rat primary mature hepatocytes were cultured using A-83-01(A) as a TGFβ receptor inhibitor, CHIR99021(C) as a GSK3 inhibitor, and Y-27632(Y) as a ROCK inhibitor (YAC) in combination, it was clarified that they proliferated about 15 times by culturing for 2 weeks. In addition, rat primary mature hepatocytes seeded at a low density ($1\times10^2$ cells/$cm^2$) were cultured in the presence of YAC, and the proliferation of each single cell was examined by time-lapse photography. The proportion of single cells that proliferated to 5 or more cells during the 5-day culture from the 2nd to the 6th day after the start of contact with YAC was about 25% and increased significantly compared with about 1.4% by culture in the absence of YAC.

1-2. Step (2)

In step (2), as a method of physically removing the colony of fibroblasts from the culture substratum, for example, a method using a scraper, a pipette chip, or the like can be mentioned. Specifically, a method in which the position of the fibroblast colony is marked on the culture substratum under a microscope, the fibroblast colony is peeled off using a scraper, a pipette chip, etc., and then washed with a medium and remove the supernatant can be mentioned. Since fibroblasts are removed also in the subsequent steps, fibroblast colonies may partly remain. In addition, step (2) may be performed one or more times (e.g., 2, 3, 4, 5, 6, 7, 8, 9 times) together with step (3) described later.

1-3. Step (3)

In step (3), as a method for detaching the cells from the culture substratum and recovering the detached cells, for example, a method for detaching the cells by an enzyme treatment or a cell dispersion and recovering them can be mentioned. Examples of the enzyme include trypsin, collagenase, hyaluronidase, elastase, pronase, DNase, papain, and the like. Examples of the cell dispersion include TrypLE Select (manufactured by Life Technologies), TrypLE Express (manufactured by Life Technologies) and the like.

As the above-mentioned trypsin, a commercially available trypsin or a substitute thereof (e.g., TrypLE™ Express (Thermo Fisher Scientific), etc.) may be used. Contact between cells and trypsin may be performed under general culture conditions. For example, it can be performed in a $CO_2$ incubator under an atmosphere of 1-10%, preferably 2-5%, more preferably about 5%, $CO_2$ concentration at 30-40° C., preferably 35-37.5° C., more preferably about 37° C. The concentration of trypsin is not particularly limited as long as it detaches the cell-cell adhesion and the cell-culture substratum adhesion, and is, for example, 0.01-0.5%, preferably 0.05-0.25%. The treatment time is not particularly limited as long as it detaches the cell-cell adhesion and the cell-culture substratum adhesion, and is, for example, 1-15 min, preferably 3-12 min, more preferably 5-10 min, further preferably 10 min.

A method for recovering the detached cells is not particularly limited and, for example, a method including pipetting the cells with a 5 mL pipette having a large tip diameter and then recovering the supernatant can be mentioned.

1-4. Step (4)

The collagen-coated culture substratum used in step (4) is not particularly limited as long as the surface of the culture substratum is coated with collagen. A produced collagen-coated culture substratum may be used, or a commercially available product may also be used. A collagen-coated culture substratum can be produced, for example, by diluting a sterile 0.5% collagen solution to 0.01% with sterile 0.01N hydrochloric acid, adding the collagen solution to the culture substratum, shaking the culture substratum to spread the collagen solution over the entirety, and removing the excess collagen solution. Examples of the commercially available product include collagen coatdish (IWAKI), BioCoa collagen I dish for culture (Corning Incorporated International) and the like.

The cells recovered in step (3) can be cultured by seeding on a collagen-coated culture substratum at a cell density of, for example, $1\times10^4$-$5\times10^5$ cells/$cm^2$, preferably $5\times10^4$-$1\times10^5$ cells/$cm^2$. As the medium, a medium widely used for culturing animal cells can be used as the basal medium. A commercially available basal medium may be used, and examples thereof include minimal essential medium (MEM), Dulbecco modified minimal essential medium (DMEM), RPMI1640 medium, 199 medium, Ham's F12 medium, William's E medium and the like. These may be used alone or in combination of two or more (e.g., mixed medium of DMEM and Ham's F12 medium (DMEM/F12), etc.), but are not particularly limited thereto. Culturing can be performed in an atmosphere with a $CO_2$ concentration of 1-10%, preferably 2-5%, more preferably about 5% in a $CO_2$ incubator, with an oxygen concentration of 1-25%, preferably 2-22%, more preferably 3-20%, at a culture temperature of 30-40° C., preferably 35-37.5° C., more preferably about 37° C.

The culture period is not particularly limited as long as the cell adheres to the culture substratum, and is, for example, 5-15 min, preferably 7-13 min, more preferably 8-12 min, further preferably 10 min.

With the above-mentioned short time (5-15 min) in step (4), fibroblasts tend to adhere to the culture substratum faster than the adhesion of liver progenitor cells to the collagen-coated culture substratum. Therefore, the purity of the liver progenitor cells can be increased by recovering unadhered cells after culturing. The cells recovered in step (4) may be seeded again on the collagen-coated culture substratum, and step (4) may be repeated. The repetition may be performed a plurality of times (e.g., 2, 3, 4, 5, 6, 7, 8, 9 times).

1-5. Other Steps

A cell population containing high-purity liver progenitor cells from which fibroblasts have been removed can be produced by the aforementioned steps (1)-(4). To further increase the purity, a further step may be performed. The further step may be, for example, a step of culturing the cells recovered in step (3) on a gelatin-coated culture substratum and recovering the cells not adhered to the culture substratum (step (3')) between step (3) and step (4).

The gelatin-coated culture substratum used in step (3') is not particularly limited as long as the surface of the culture substratum is coated with gelatin. A produced gelatin-coated culture substratum may be used, or a commercially available product may also be used. A gelatin-coated culture substratum can be produced, for example, by adding autoclave-treated 0.1% gelatin solution to a culture substratum, shaking the culture substratum to spread the gelatin solution over the entirety, standing the culture substratum for 10 min or longer at room temperature, and removing the excess gelatin solution. Examples of the commercially available product include gelatin coat dish (IWAKI), BioCoat gelatin culture dish (Corning Incorporated International) and the like.

The cells recovered in step (3) can be cultured by seeding on a gelatin-coated culture substratum at a cell density of, for example, $5\times10^3$-$2\times10^6$ cells/$cm^2$, preferably $5\times10^4$-$5\times10^5$ cells/$cm^2$. The medium and the culture conditions are the same as in step (4). The culture period is not particularly limited as long as the cell adheres to the culture substratum, and is, for example, 10 min-5 hr, preferably 20 min-4 hr, more preferably 30 min-3 hr.

In step (3'), as compared with fibroblasts, liver progenitor cells tend to be difficult to adhere to the gelatin-coated culture substratum. Therefore, the purity of the liver progenitor cells can be increased by recovering unadhered cells after culturing.

The further step may be, for example, a step of culturing the cells recovered in step (4) on a collagen-coated culture substratum and removing the cells not adhered to the culture substratum (step (5)) after step (4).

The collagen-coated culture substratum to be used in step (5) may be similar to one used in step (4).

The cells recovered in step (4) can be seeded, for example, on a collagen-coated culture substratum at half the cell density in step (4). The medium and the culture conditions are the same as in step (4). The culture period is not particularly limited as long as the cell adheres to the culture substratum, and may be cultured, for example, until they reach confluence. Examples of specific culture period include 90 days-3 days (e.g., 90 days, 80 days, 70 days, 60 days, 50 days, 40 days, 35 days, 30 days, 28 days, 24 days, 21 days, 18 days, 14 days, 12 days, 10 days, 7 days, 5 days, 4 days, 3 days).

In step (5), more hepatic progenitor cells exist than fibroblasts, and as a result, more liver progenitor cells tend to adhere to the collagen-coated culture substratum. Therefore, the purity of the liver progenitor cells can be increased after culturing.

In the present invention, the series of steps of step (3'), step (4) and step (5) are performed one or more times (e.g., 2, 3, 4, 5, 6, 7, 8, 9 times). In addition, the series of steps of step (4) and step (5) may be performed one or more times (e.g., 2, 3, 4, 5, 6, 7, 8, 9 times).

A further step may be, for example, a step of detaching and recovering the cells that adhered to the culture substratum in step (5) from the aforementioned culture substratum before reaching confluence (step (6)). "Before reaching confluence" means a state of 20-95% confluence, preferably 50-90% confluence, more preferably 70-85% confluence. Examples of the method for detaching the cells and the method for recovering the detached cells include methods similar to those in step (3).

In step (6), liver progenitor cells tend to be more easily detached by a trypsin treatment than fibroblasts. Therefore, the purity of liver progenitor cells can be increased by recovering the cells detached by the trypsin treatment.

In addition, before and after step (6), or without performing step (6), a step of detaching and recovering the cells that adhered to the culture substratum in step (5) from the aforementioned culture substratum after reaching confluence (step (7)) may be performed. "After reaching confluence" means a state of 90-100% confluence, preferably 95-100% confluence, more preferably 98-100% confluence. Examples of the method for detaching the cells include methods similar to the method in step (3). The method for recovering the detached cells is not particularly limited. For example, a method including gently shaking the dish before pipetting the cells, detaching and removing the cells aggregated in a network (e.g., fibroblasts), pipetting the cells with a 5 mL pipette having a large tip diameter, or the like, and then recovering newly detached cells can be mentioned.

In step (7), liver progenitor cells tend to be difficult to detach by a trypsin treatment than fibroblasts. Therefore, the purity of liver progenitor cells can be increased by removing the cells detached by the trypsin treatment.

2. Cell Population Containing Liver Progenitor Cells

The present invention also provides a cell population containing liver progenitor cells (hereinafter sometimes to be referred to as "the cell population of the present invention") which is obtained by the production method of the present invention. In one embodiment, the proportion of liver progenitor cells (number of liver progenitor cells/total number of cells) in the aforementioned cell population is at least not less than 50%, preferably not less than 60%, more preferably not less than 70%, further preferably not less than 80%, most preferably not less than 90%. Therefore, in the most preferred embodiment of the present invention, a cell population containing the liver progenitor cells in which the proportion of the liver progenitor cells (number of liver progenitor cells/total number of cells) is not less than 90% (e.g., 91, 92, 93, 94, 95, 96, 97, 98, 99 or 100%) is provided. The proportion of liver progenitor cells can be measured by flow cytometry using the marker described in the above-mentioned 1. as an index. Such cell population may have a higher proportion of liver progenitor cells and a higher activity than a cell population obtained by a conventional method.

3. Cell Transplantation Therapy Agent

The present invention also provides a cell transplantation therapy agent containing the cell population of the present invention (hereinafter, sometimes to be referred to as "the cell transplantation therapy agent of the present invention"). As described above, the cell population of the present invention is a high-quality cell population having the property of high purity of liver progenitor cells. Therefore, the cell population of the present invention is suitable for use as a starting material for a cell transplantation therapy agent, and the cell population or the cell transplantation therapy agent of the present invention is useful for the treatment, improvement or prophylaxis of alcoholic or non-alcoholic hepatopathy, liver fibrosis, fatty liver and the like. Therefore, a method for the treatment, improvement or prophylaxis of hepatopathy including administering or transplanting an effective amount of the cell population or cell transplantation therapy agent of the present invention to a mammal (e.g., human, mouse, rat, monkey, cow, horse, pig, dog, etc.) to be the subject of the treatment or prophylaxis is also encompassed in the present invention. Hepatopathy to be the target of the treatment, improvement or prophylaxis is not particularly limited and, for example, hepatitis such as viral hepatitis, acute hepatitis, chronic hepatitis and the like, alcoholic hepatopathy, drug-induced hepatopathy and the like can be mentioned.

When the cell population of the present invention is used as a cell transplantation therapy agent, considering that a rejection reaction does not occur, it is desirable to use a cell population containing liver progenitor cells established from stem cells having the same or substantially the same HLA genotype with that of the individual who receives transplantation. As used herein, "substantially the same" means that the HLA genotype is the same as that of the transplanted cells to the extent that the immune response can be suppressed by the immunosuppressant. For example, it is a somatic cell having an HLA type in which 3 gene loci of HLA-A, HLA-B and HLA-DR, or 4 gene loci additionally including HLA-C, match. When the above-mentioned cells have a gene mutation that causes hepatopathy, it is preferable to repair the mutation of the gene in advance by using a method such as genome editing (e.g., CRISPR system, TALEN, ZFN etc.) and the like. When sufficient cells cannot be obtained due to age, constitution, and the like, it is also possible to transplant the cells by enclosing them in a capsule of polyethylene glycol or silicon, a porous container, or the like to avoid rejection.

The above-mentioned cell population is produced as a parenteral preparation such as injection, suspension, drip transfusion or the like by mixing with a pharmaceutically acceptable carrier and the like according to conventional means. Examples of the pharmaceutically acceptable carrier that can be contained in the parenteral preparation include aqueous solutions for injection such as isotonic solution containing physiological saline, glucose and other auxiliary agents (e.g., D-sorbitol, D-mannitol, sodium chloride, and the like). The cell transplantation therapy agent of the present invention may be blended with, for example, buffering agent (e.g., phosphate buffer, sodium acetate buffer), soothing agent (e.g., benzalkonium chloride, procaine hydrochloride, and the like), stabilizer (e.g., human serum albumin, polyethylene glycol, and the like), preservative, antioxidant and the like. When the transplantation therapeutic agent of the present invention is formulated as an aqueous suspension, the cell population may be suspended in the aqueous solution to a concentration of about $1 \times 10^6$-about $1 \times 10^8$ cells/mL. In addition, the dose or transplantation amount, and the administration frequency or transplantation frequency of the cell population or the cell transplantation therapy agent of the present invention can be appropriately determined according to the age, body weight, symptoms and the like of the mammal that receives the administration.

The cell transplantation therapy agent of the present invention is provided in a cryopreserved state under conditions generally used for cryopreservation of cells (e.g., CELLBANKER (registered trade mark) 1 (Takara Bio Inc.)), and is thawed when in use. In this case, serum or a substitute thereof, an organic solvent (e.g., DMSO) and the like may be further contained. In this case, the concentration of the serum or a substitute thereof is not particularly limited, and may be about 1-about 30% (v/v), preferably about 5-about 20% (v/v). The concentration of the organic solvent is not particularly limited, and may be about 0-about 50% (v/v), preferably about 5-about 20% (v/v).

4. Cell Population Containing Hepatocytes or Bile Duct Epithelial Cells

The present invention also provides a cell population containing hepatocytes or bile duct epithelial cells that is obtained by inducing differentiation of the cell population of the present invention. Induction of differentiation of liver progenitor cells into hepatocytes can be performed by a method known per se. For example, a method of culturing in a culture medium supplemented with oncostatin M (OsM), dexamethasone (Dex), hepatocyte growth factor (HGF) and the like (Journal of Cellular Physiology, Vol. 227(5), p. 2051-2058 (2012); Hepatology, Vol. 45(5), p. 1229-1239 (2007)), a method combining the Matrigel overlay method (Hepatology 35, 1351-1359 (2002)) and the like can be mentioned. A TGFβ receptor inhibitor, a GSK3 inhibitor, and a ROCK inhibitor may or may not be added to the medium for inducing differentiation into hepatocytes, but addition thereof is preferable. Induction of differentiation of liver progenitor cells into BEC can be performed by a method known per se. For example, a method of culturing in a medium containing EGF and insulin-like growth factor 2 (IGF2) using a collagen gel, and the like can be mentioned. Alternatively, the method described in WO 2017/119512 may be used.

5. Use of Hepatocyte or Bile Duct Epithelial Cell of the Present Invention

The present invention also provides a method for evaluating metabolism of a test compound in the body of a mammal, or a method for evaluating hepatotoxicity of a test compound in a mammal, each including a step of bringing the hepatocytes or bile duct epithelial cells of the present invention with a test compound. These methods include a step of measuring the metabolism of the test compound in hepatocytes, or a step of detecting or measuring the presence or absence or degree of damage of the aforementioned cells.

Conventionally, animal models and the like have been used to evaluate the metabolism and hepatotoxicity of test compounds. However, the number of test compounds that can be evaluated at one time is limited, and there was a problem that the evaluation obtained with animal models and the like cannot be directly applied to humans. Therefore, an evaluation method using a human liver cancer cell line or a primary normal human cultured hepatocyte has been adopted. However, since human liver cancer cell line is a cancer cell, there remains the possibility that the evaluation obtained with human liver cancer cell line cannot be applied to normal human hepatocytes. In addition, primary normal human cultured hepatocyte has problems in terms of stable supply and cost. In addition, it has been shown that cell lines of primary normal human culture hepatocytes that have been immortalized show reduced CYP3A4 activity as compared with non-immortalized cell line (International Journal of Molecular Medicine 14: 663-668, 2004, Akiyama I. et al.). While such problem can be solved by using CLiP, the amounts of CLiP provided by a conventional method and the hepatocytes and bile duct epithelial cells derived from the cells are not sufficient. Therefore, the amounts of hepatocytes and bile duct epithelial cells derived from a sufficient amount of CLiP by the method of the present invention are suitable for the above-mentioned method.

The test compound used in the present invention is not particularly limited. Examples thereof include, but are not limited to, single compounds such as xenobiotic substance, natural compound, organic compound, inorganic compound, protein, peptide and the like, and expression product of compound library and gene library, cell extract, cell culture supernatant, fermented microbial product, marine organism extract, plant extract, and the like. Examples of the xenobiotic substance include, but are not limited to, candidate compounds for drugs and foods, and existing drugs and foods, and any xenobiotic substances for living organism are included in the xenobiotic substance of the present invention. More specifically, Rifampin, Dexamethasone, Phenobarbital, Ciglirazone, Phenytoin, Efavirenz, Simvastatin, β-Naphthoflavone, Omeprazole, Clotrimazole, 3-Methylcholanthrene and the like can be exemplified.

While contact between hepatocytes and a test compound is generally performed by adding the test compound to the medium or culture medium, the method is not limited to this method. When the test compound is a protein or the like, contact can also be made by introducing a DNA vector expressing the protein into the cell.

The metabolism of the test compound can be measured by a method well known to those of ordinary skill in the art. For example, when a metabolic product of a test compound is detected, it is determined that the test compound has been metabolized. In addition, when the expression of genes of enzymes (such as CYP; cytochrome p450), MDR, MRP, and the like is induced by contact with a test compound, or when the activity of these gene increases, it is determined that the test compound has been metabolized. The degree of damage can be measured using, for example, the survival rate of hepatocytes or hepatopathy markers such as GOT, GPT and the like as indices.

EXAMPLE

The present invention is explained more specifically in the following by referring to Examples and the like; however, the present invention is not limited by the following Examples and the like.

Example 1

1. Preparation of Cell Population Containing Liver Progenitor Cells and Fibroblasts (Step (1))
1-1. Preparation of Human Primary Hepatocytes
1-1-1. Reagent

TABLE 1 preperfusion solution

| composition | manufacturer | product No. | amount added [mL] | concentration [—] |
|---|---|---|---|---|
| Hanks' balanced salt solution Ca(−), Mg(−) | Sigma | H9394-500ML | 500 | — |
| 0.1M EGTA | Wako | 346-01312 | 2.5 | 5 mM |
| HEPES Buffer Solution(1M) | GIBCO | 15630-080 | 5.0 | 10 mM |
| Penicillin-Streptomycin | GIBCO | 10378-016 | 5.0 | 1% |

TABLE 2 collagenase solution

| composition | manufacturer | product No. | amount added [mL] | concentration [—] |
|---|---|---|---|---|
| Hanks' balanced salt solution Ca (+), Mg (+) | Sigma | H9269-1L | 1000 | — |
| HEPES Buffer Solution (1M) | GIBCO | 15630-080 | 10 | 10 mM |
| Penicillin-Streptomycin | GIBCO | 10378-016 | 10 | 1% |
| 50% TZ (Otsuka sugar solution: glucose) | Otsuka Pharmaceutical Factory | | 1.6 | 0.16% |
| 7% Meylon (sodium hydrogencarbonate) | Otsuka Pharmaceutical Factory | | 25 | 2.5% |
| collagenase stock solution | Wako | 032-22364 | | |
| Trypsin inhibitor stock solution | Sigma | T9128-1G | | | collagenase stock solution: 42500 unit/mL (147 mg/mL) was used at final concentration of 130 unit/mL
Trypsin inhibitor stock solution: 50 mg/mL (1 g/20 mL) was used at final concentration of 0.1 mg/mL

TABLE 3

Hepatocyte Medium 1 (for cell preparation)

| composition | manufacturer | product No. | amount added [mL] | concentration [—] |
|---|---|---|---|---|
| D-MEM low glucose | Wako | 041-29775 | 500 | — |
| 350 g/L Glucose stock solution | GIBCO | | 5.0 | 3.5 g/L |

TABLE 3-continued

Hepatocyte Medium 1 (for cell preparation)

| composition | manufacturer | product No. | amount added [mL] | concentration [—] |
|---|---|---|---|---|
| HEPES Buffer Solution(1M) | GIBCO | 15630-080 | 5.0 | 10 mM |
| Penicillin-Streptomycin-Glutamine | GIBCO | 10378-016 | 5.0 | 1% |
| FBS | GIBCO | 26140-079 | 50 | 10% (8.85) |

1-1-2. Preparation Method of Human Primary Hepatocytes

After obtaining informed consent, non-cancerous tissue (about 30 g) of the hepatic tissue resected due to liver cancer or the like was resected in the operating room and washed with about 250 mL of Solulact in a bowl at 4° C. About 250 mL of Solulact was placed in a transport bottle, human hepatic tissue was immersed therein, and transported to a clean bench in the laboratory. Free human mature liver parenchymal cells were prepared by a two-step collagenase perfusion method. The procedure thereof is shown below.

(1) Using a 20 mL syringe and an 18 G Surflo indwelling needle, a preperfusion solution warmed to 37° C. was flowed from the blood vessel on the hepatic incision surface at 200 mL/7-12 min to remove blood.

(2) A collagenase solution warmed to 37° C. was flowed at 400 mL/15-20 min to disperse hepatocytes.

(3) The liver with a paste-like inside of hepatic capsule was shredded with scissors.

(4) Two pieces of gauze were placed on top of each other on a strainer, moistened with Hepatocyte Medium 1 (Hep 1 medium) maintained at 4° C., and the cells were filtered.

(5) The cells were filtered through a metal mesh filter (pore diameter 63 μm).

(6) Centrifugation was performed (50×g, 2 min×3 times).

(7) 30 mL of Hep 1 medium was added and the cells were suspended, and the number of cells and the viability were measured.

(8) Centrifugation was performed using 27% Percoll solution (70×g, 7 min, 4° C.) to remove non-parenchymal cells and dead cells. Specifically, Percoll stock solution (Percoll PLUS, #17-5445-01, GE Healthcare, Sweden) (13.5 mL), 10× Hanks (1.5 mL), and the cell suspension (35 mL) (hepatocyte suspension+Hep 1 medium) (total volume 50 mL) was dispensed into two conical tubes by 25 mL each and centrifuged.

(9) The supernatant was discarded, and a given amount (20-30 mL) of Hep 1 medium was added to the remaining pellets. Cell count and viability were measured.

1-2. Cell Population Containing Hepatocyte-Derived Liver Progenitor Cells and Fibroblasts 1-2-1. Medium Preparation The composition of hCLiP (human Chemically-induced Liver Progenitors) induction medium (SHM+YAC) is shown below. (Rat and mouse CLiP induction medium of Katsuda T, et al., Cell Stem Cell, 2017 was used.) Here, SHM means a culture medium for small hepatocyte. CLiP means liver progenitor cells induced from mature hepatocytes by Y-27632, A-83-01, and CHIR99021 (YAC).

TABLE 4

| Basal medium | DMEM/F12 with NaHCO$_3$, L-Glu |
|---|---|
| HEPES | 5 mM |
| L-Proline | 30 mg/L |
| NaOH | 0.0025N |
| BSA | 0.05% |
| EGF | 10 ng/mL |
| ITS-X supplement | |
| Dexamethasone | $10^{-7}$M |
| Nicotinamide | 10 mM |
| ascorbic acid (Asc2P) | 1 mM |
| Pen/Strep | |
| Y-27632 (ROCK inhibitor) | 10 uM |
| A-83-01 (TGFβ signal inhibitor) | 0.5 uM |
| CHIR99021 (GSK3 inhibitor) | 3 uM |

1-2-2. Method for Preparing Cell Population Containing Liver Progenitor Cells and Fibroblasts Liver progenitor cells were obtained from hepatocytes by a reprogramming method using a low-molecular-weight compound. Specifically, it was as follows.

The human primary hepatocytes obtained in the aforementioned "1-1. Preparation of human primary hepatocytes" were seeded (SHM+YAC) on a collagen-coated dish at 1.2×10$^4$ cells/cm$^2$. The medium was changed once every two days, and the cells were cultured at 37° C. (1-2 months) until they became confluent. The cells were treated with TrypLE™ Express for 10 min to perform passage. (High-purity hCLiP can be obtained around Passage 1-3 by combining the following fibroblast removal methods.)

2. Detachment and Recovery of Cells from Culture Substratum (Step (2) and Step (3))

The position of fibroblast colony (appearing from about day 10 of culture) was marked under a microscope on the culture substratum with oily magic. Fibroblast colonies were physically detached using a scraper, pipette chip, or the like. The supernatant (detached fibroblast) was removed by washing twice with a culture medium. This was performed a couple of times before reaching confluence. The cells were treated with TrypLE™ Express for 10 min to perform passage.

Figure 1:
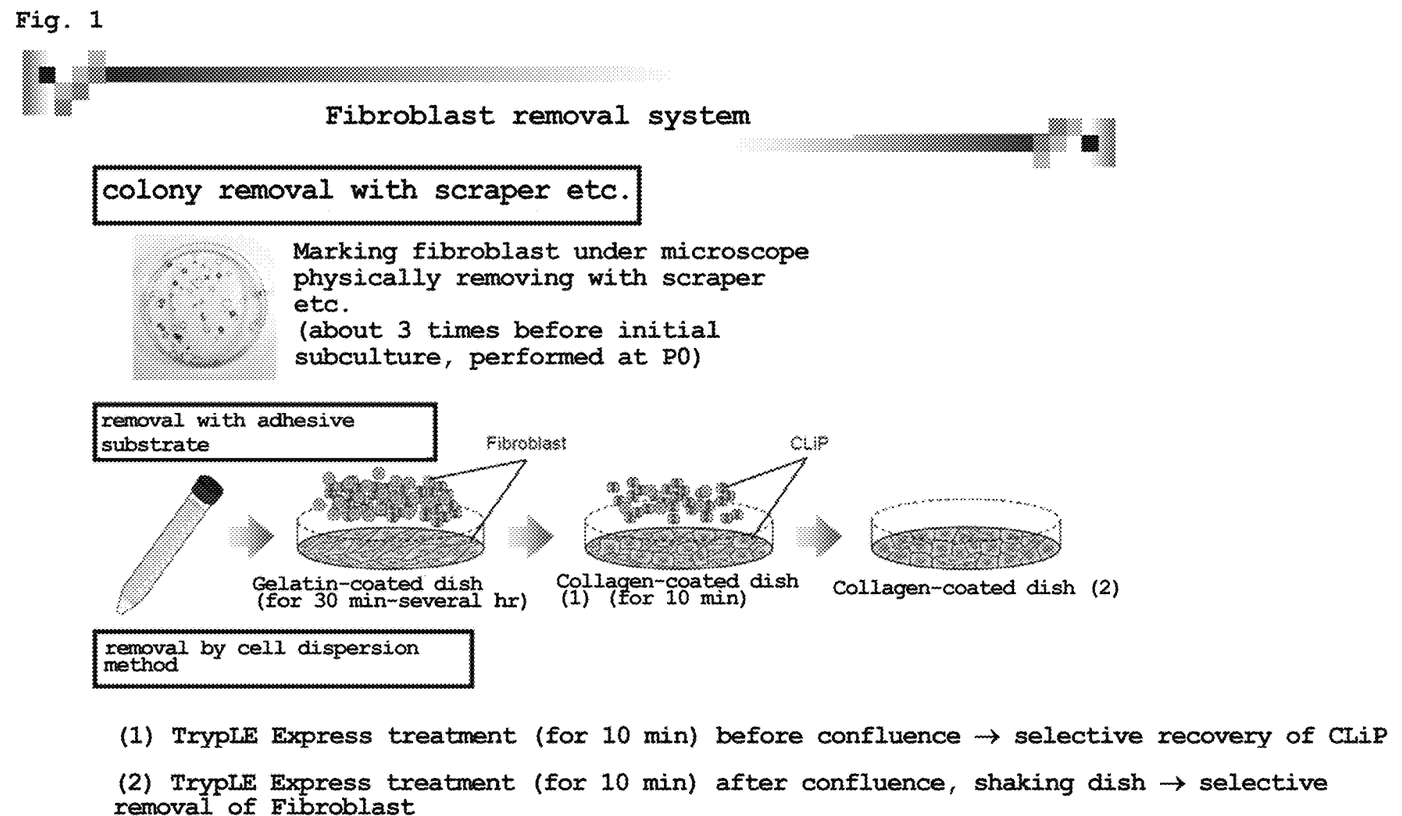
FIG. 1 shows an outline of the present invention. The upper panel is one embodiment of a method relating to the step of physically removing a colony of fibroblasts from a cell substratum.

The step of physically removing the fibroblast colonies from the cell substratum was performed as shown in the upper panel of FIG. 1.

3. Culture of Recovered Cells on Gelatin-Coated Culture Substratum, and Recovery of Cells not Adhered to Culture Substratum (Step (3'))

The passaged hCLiP was seeded on a gelatin-coated dish (IWAKI) at 2.5×10$^5$ cells/cm$^2$ (SHM+YAC), cultured at 37° C. for 30 min to allow adhesion of the cells (Gelatin), and washed twice with culture medium. The supernatant (unadhered cells) was recovered.

4. Culture of Recovered Cells on Collagen-Coated Culture Substratum, and Recovery of Cells not Adhered to Culture Substratum (Step (4))

The recovered unadhered cells were seeded on a collagen-coated dish (IWAKI) at 5.0×10$^4$ cells/cm$^2$ (SHM+YAC), cultured at 37° C. for 10 min to allow adhesion of the cells (Collagen 1), and washed twice with culture medium. The supernatant (unadhered cells) was recovered.

5. Culture of Recovered Cells on Collagen-Coated Culture Substratum, and Removal of Cells not Adhered to Culture Substratum (Step (5))

The recovered unadhered cells were seeded on a collagen-coated dish (IWAKI) at 2.5×10$^4$ cells/cm$^2$ (SHM+YAC), adhered at 37° C., unadhered cells were removed, and the cells were cultured until they reached confluence (Collagen 2).

6. Results

Figure 2:
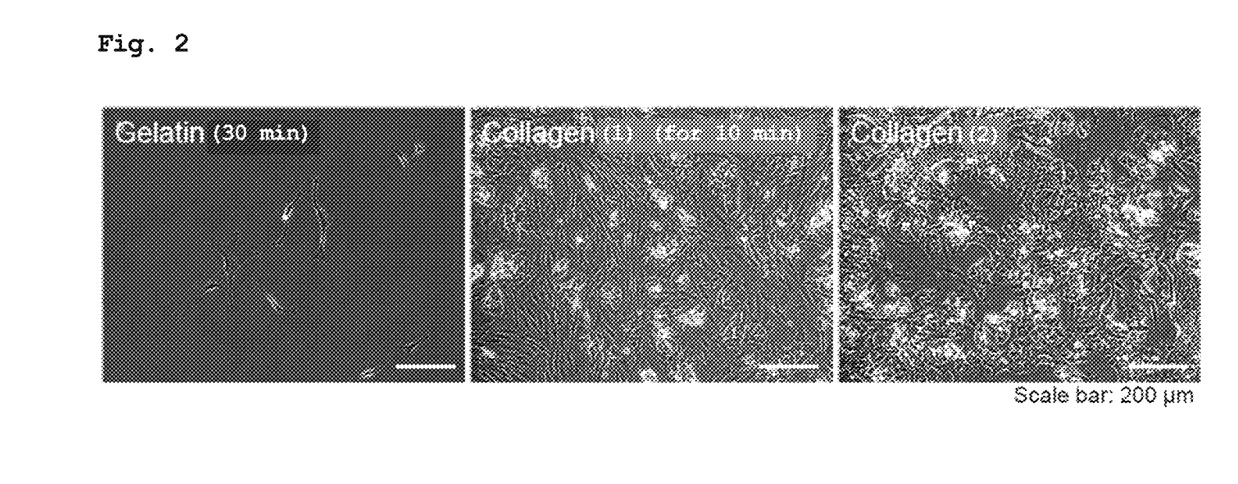
FIG. 2 shows phase-contrast microscopic images of cells obtained by culturing a cell population containing liver progenitor cells and fibroblasts on gelatin-coated and collagen-coated culture substratums. Cells cultured on a gelatin-coated culture substratum, a collagen-coated culture substratum, and a collagen-coated culture substratum are shown from the left.

The results are shown in FIG. 2. The left is a phase-contrast microscopic image of cells cultured for 1 day on a gelatin-coated culture substratum in the above-mentioned 3. Only fibroblasts were adhered, and hCLiP was hardly detected. The center is a phase-contrast microscopic image of cells cultured for 12 days on a collagen-coated culture substratum in the above-mentioned 4. Many fibroblasts proliferated, and hCLiP was partially observed. The right is a phase-contrast microscopic image of cells cultured for 12 days on a collagen-coated culture substratum in the above-mentioned 5. Most were hCLiP and fibroblasts were few. By visual observation, it was confirmed that the hCLiP/total cell count ratio was at least not less than 80%. From the results in the above-mentioned central Figure and the right Figure, it was understood that most of the cells not recovered in the above-mentioned 4 were fibroblasts, most of the recovered cells were hCLiP, and that the purity of hCLiP was sufficiently increased at the time point of step (4).

Example 2

The cells adhered to a collagen-coated culture substratum were obtained by the same method as in Examples 1.-5. The cells were recovered, and the same operations as in 3.-5. of Example 1 were performed to obtain cells adhered to a collagen-coated culture substratum. The cells were recovered, and the same operations as in 3. and 4. of Example 1 were performed. It was confirmed that the cells cultured in 4. became confluent, and the same enzyme treatment as in Example 1 was performed to detach and recovered the cells. Successively, the recovered cells were subjected to the same operations as in 3.-5. of Example 1. In the operation of 5, the culture period before reaching confluence was 28 days.

7. Results

Figure 3:
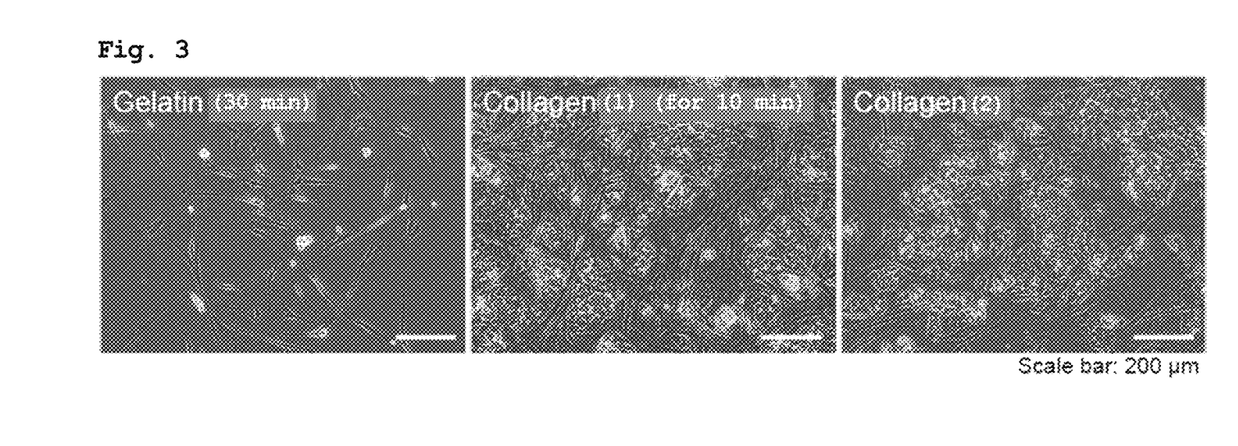
FIG. 3 shows, similar to FIG. 2, phase-contrast microscopic images of cells obtained by culturing a cell population containing liver progenitor cells and fibroblasts on gelatin-coated and collagen-coated culture substratums. Cells cultured on a gelatin-coated culture substratum, a collagen-coated culture substratum, and a collagen-coated culture substratum are shown from the left.

The results are shown in FIG. 3. The left is a phase-contrast microscopic image of cells cultured for 1 day on a gelatin-coated culture substratum in the final operation of 3. Only fibroblasts were slightly adhered, and hCLiP was hardly detected. The center is a phase-contrast microscopic image of cells cultured for 28 days on a collagen-coated culture substratum in the final operation of 4. Many fibroblasts proliferated, and hCLiP was partially observed. The right is a phase-contrast microscopic image of cells cultured for 28 days on a collagen-coated culture substratum in the final operation of 5. Most were hCLiP and fibroblasts were few. By visual observation, it was confirmed that the hCLiP/total cell count ratio was at least not less than 90%. From the above results, it was shown that the density of hCLiP can be maintained high even when passage was repeated.

INDUSTRIAL APPLICABILITY

The method of the present invention can sufficiently remove fibroblasts from a cell population containing hepatocyte-derived liver progenitor cells and fibroblasts. Therefore, it can be used for the production of a cell population with a highly-increased purity of liver progenitor cells after sufficient removal of the fibroblasts.

This application is based on a patent application No. 2019-068911 filed in Japan (filing date: Mar. 29, 2019), the contents of which are incorporated in full herein.

The invention claimed is:

1. A method for producing a cell population comprising liver progenitor cells wherein purity of liver progenitor cells is higher than that in a starting cell population comprising liver progenitor cells and fibroblasts, comprising the steps of
   (1) preparing a culture substratum comprising the starting cell population comprising liver progenitor cells and fibroblasts,
   (2) physically removing the fibroblast colony from the culture substratum,
   (3) detaching cells from the culture substratum, and recovering the detached cells, and
   (3') culturing the recovered cells on a gelatin-coated culture substratum, and recovering the cells not adhered to the culture substratum,
   (4) culturing the cells recovered in the step (3) on a collagen-coated culture substratum, and recovering the cells not adhered to the culture substratum, and
   (5) culturing the recovered cells on a collagen-coated culture substratum, and removing the cells not adhered to the culture substratum
   thereby obtaining a cell population comprising liver progenitor cells having a reduced number of fibroblasts compared to the starting cell population.

2. The method according to claim 1, further comprising a step of (6) detaching and recovering the cells adhered to the culture substratum from the culture substratum before reaching confluence after the step (5).

3. The method according to claim 1, further comprising a step of (7) performing a detaching treatment after reaching confluence after step (5), and removing the cells detached from the culture substratum.

4. The method according to claim 1, wherein the culture period in the step (4) is 5 min-15 min.

5. The method according to claim 1, wherein the cell population prepared in the step (1) comprises a liver progenitor cell obtained by reprogramming hepatocyte.

6. The method according to claim 1, wherein the step (3')-step (5) are repeated at least twice.

7. The method according to claim 1, wherein at least 50% of the cell population obtained in step (4) is liver progenitor cells.

* * * * *